United States Patent [19]

Eberle

[11] 3,892,771
[45] July 1, 1975

[54] SUBSTITUTED DIHYDROISOINDOLES
[75] Inventor: Marcel K. Eberle, Madison, N.J.
[73] Assignee: Sandoz, Inc., Hanover, N.J.
[22] Filed: July 9, 1973
[21] Appl. No.: 377,642

Related U.S. Application Data

[63] Continuation-in-part of Ser. No. 323,629, Jan. 15, 1973, abandoned, which is a continuation-in-part of Ser. No. 301,660, Oct. 27, 1972, abandoned, which is a continuation-in-part of Ser. No. 240,277, March 31, 1972, abandoned, which is a continuation-in-part of Ser. No. 220,494, Jan. 24, 1972, abandoned, which is a continuation-in-part of Ser. No. 170,332, Aug. 9, 1971, abandoned.

[52] U.S. Cl. .............. 260/326.1; 260/325; 424/274
[51] Int. Cl. ................... C07d 27/00; C07d 27/48
[58] Field of Search .......... 260/325, 326.1; 424/274

Primary Examiner—Elbert L. Roberts
Attorney, Agent, or Firm—Gerald D. Sharkin; Robert S. Honor; Thomas O. McGovern

[57] ABSTRACT

Substituted dihydroisoindoles e.g., 1-($\alpha$-hydroxy-p-chlorophenethyl)-1-(p-chlorophenyl)-2,3-dihydroisoindole are prepared from corresponding 1-(substituted phenacyl)-1-(substituted phenyl)-3-ethoxy-1H-isoindole, and are useful in the treatment of lipidemia.

35 Claims, No Drawings

SUBSTITUTED DIHYDROISOINDOLES

This application is a continuation-in-part of copending U.S. Patent application Ser. No. 323,629, filed Jan. 15, 1973, now abandoned, which in turn is a continuation-in-part of copending U.S. Patent application Ser. No. 301,660, filed Oct. 27, 1972 now abandoned which in turn in a continuation-in-part of U.S. Patent application Ser. No. 240,277, filed Mar. 31, 1972 now abandoned which in turn is a continuation-in-part of U.S. Patent application Ser. No. 220,494, filed Jan. 24, 1972 now abandoned, which in turn is a continuation-in-part of U.S. Patent application Ser. No. 170,332, filed Aug. 9, 1971, now abandoned.

This invention relates to substituted dihydroisoindoles and to their preparation. In particular, the application relates to 1-(α-hydroxy-substituted phenethyl)-1-(substituted phenyl)-2,3-dihydroisoindoles, their pharmaceutically acceptable acid addition salts, intermediates used in their preparation and to their use as hypocholesterolemic agents.

The compounds of this invention may be represented by the following formula:

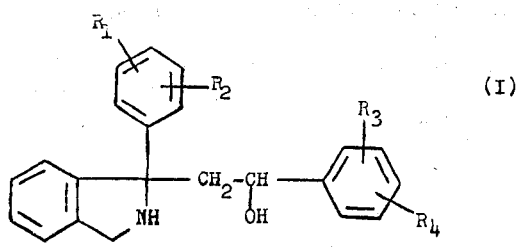

where
R$_1$ and R$_2$ each independently represent hydrogen or halo having an atomic weight of 19 to 36 and
R$_3$ and R$_4$ each independently represents hydrogen; lower alkyl having 1 to 4 carbon atoms, e.g., methyl, ethyl or isopropyl; lower alkoxy having 1 to 4 carbon atoms, e.g. methoxy, ethoxy, isopropoxy and the like; halo having an atomic weight of 19 to 36 or trifluoromethyl;

provided that when both R$_3$ and R$_4$ are trifluoromethyl they are not on adjacent carbon atoms, or pharmaceutically acceptable acid addition salts thereof.

The compounds of formula (I) possess two asymmetric carbon atoms and therefore exist as four optical isomers. Racemic and diastereoisomeric mixtures of the compound of formula (I) may be separated into individual isomers by conventional techniques.

The compounds of the formula I are obtainable by the following reaction scheme:

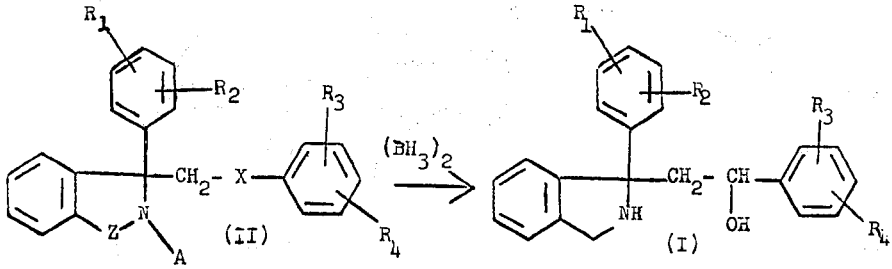

wherein
R$_1$, R$_2$, R$_3$, R$_4$ and the proviso are as previously defined; and
X is —CHOH— or —CO—;
Z is —CO— or

and
A is hydrogen when Z is —CO— or
AB together represent a second carbon to nitrogen bond when Z is

The compounds of the formula (I) are prepared by reducing a compound of the formula (II) with diborane in a suitable inert organic solvent. Although the particular solvent used is not critical, hydrogen solvents, e.g., benzene, toluene, xylene and the ethers such as diethylether, tetrahydrofuran and dioxane are preferred, especially tetrahydrofuran. The production of compounds (I) may be carried out at a temperature of from about 0° to 80°C, preferably 20° to 30°C. The reaction time may vary widely and is usually in the range of from 1 to 48 hours. The reaction can be carried out in an inert atmosphere such as helium, argon, or nitrogen. Recovery of the compounds of formula (I) may be affected using conventional techniques, e.g., filtration, recrystallization, etc.

The compounds of the formula (II) in which X is —CO— and Z is

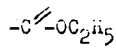

is the preferred starting material and may be prepared by the following procedure:

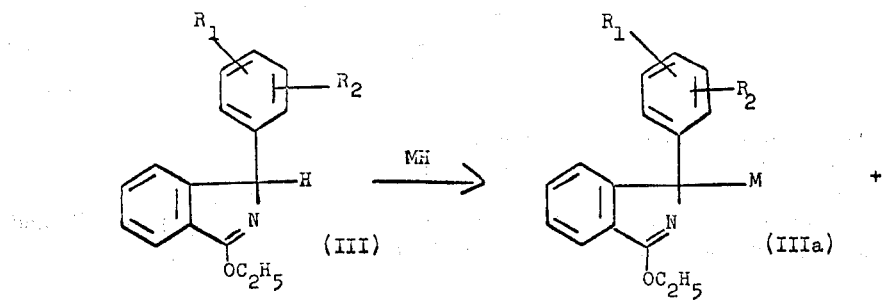

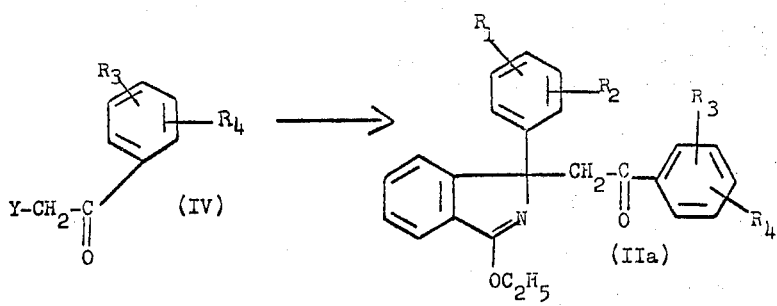

where
- MH is an alkali metal hydride
- Y is halo having an atomic weight of 35 to 80 and
- $R_1$, $R_2$, $R_3$, $R_4$ and the proviso are as previously defined.

The compounds of formula (IIa) are prepared by treating a compound of formula (III) first with an alkali metal hydride and then with a substituted phenacylhalide in a suitable inert organic solvent. The alkali metal hydride is preferably sodium hydride or potassium hydride. The particular inert solvent used is not critical but dimethylformamide is particularly preferred. The temperature is not critical, but the process is preferably carried out at a temperature of from about 0° to 80°C, especially 20° to 30°C. The reaction can be carried out in an inert atmosphere such as previously indicated and the time may vary widely and is usually in the range of 1 to 24 hours. Recovery of the product may be effected using conventional techniques, e.g., filtration, recrystallization, etc.

The compounds of formula (II) in which X is —CHOH— may be prepared by the following reaction scheme:

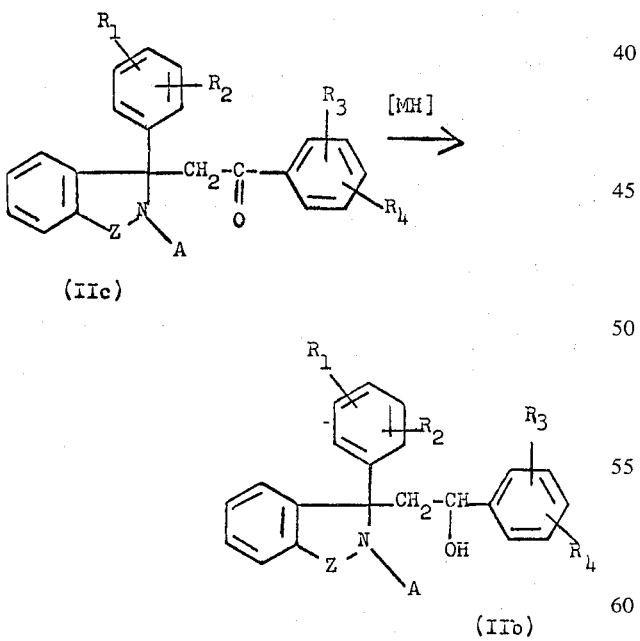

where
- [MH] is an alkali metal reducing agent and
- A, Z, $R_1$, $R_2$, $R_3$, $R_4$ and the proviso are as previously defined.

The compounds of formula (IIb) are prepared by treating a compound of formula (IIc) with an alkali metal reducing agent preferably an alkali metal borohydride reducing agent in an inert solvent. The particular alkali metal reducing agent used is not critical although sodium borohydride is the preferred reducing agent. The particular solvent used will depend on the reducing agent used and include lower alkanols, hydrocarbons, such as benzene, toluene and xylene, and ethers, such as diethyl ether, tetrahydrofuran and dioxane with the borohydrides and with the alkali metal hydrides, all of the foregoing excluding the alkanols. The process is suitable effected at a temperature of from −70° to 80°C, preferably −70° to −40° for the more active alkali metal hydrides and 20° to 30°C for the alkali metal borohydrides. The reaction time is not critical and may for example vary from 1 to 5 hours. The reaction is preferably carried out in an inert atmosphere such as nitrogen, argon or helium.

The process for preparing the compounds of formula (IIb) yields two racemic isomers, both of which contain two enantiomers. The racemic isomers are readily separated from each other by conventional techniques, e.g., chromatotraphy.

The compounds of formula (II) in which Z is —CO— and A is hydrogen can be prepared in accordance with the following scheme:

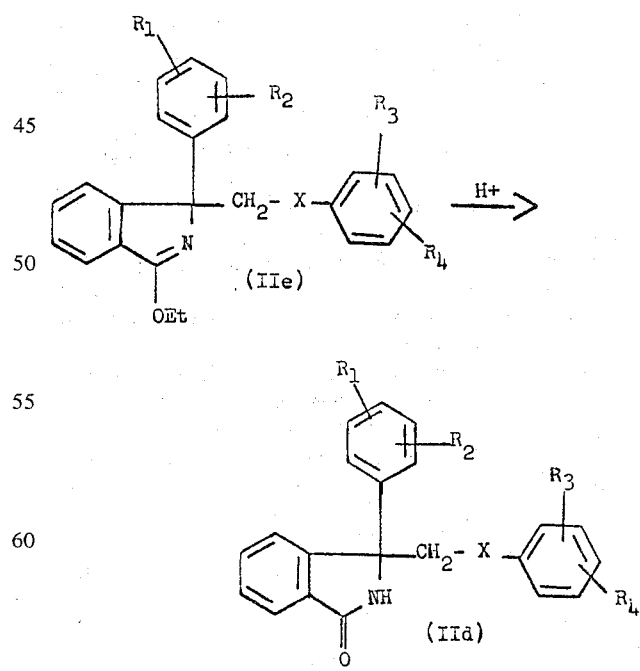

where
X, $R_1$, $R_2$, $R_3$, $R_4$ and the proviso are as defined above.

The compounds of formula (IId) are prepared by hydrolyzing a compound of the formula (IIe) in an inert solvent under acidic conditions, i.e., at a pH value of less than 3 and preferably from 1 to 2. Although the particular acid used to provide the acidic conditions is not critical, sulphuric acid, p-toluene sulfonic acid and especially hydrochloric acid are preferred. The process is normally carried out at temperatures of from 40° to 100°C. preferably from 40° to 80°C. The inert solvent used may be any water-miscible organic solvent, preferably a lower alcohol such as methanol or ethanol. Neither the temperature nor the particular solvent used is critical. The product is recovered by conventional techniques, e.g., evaporation or crystallization.

The compounds of the formula (III) are known and can be prepared from a corresponding phthalimidine (V):

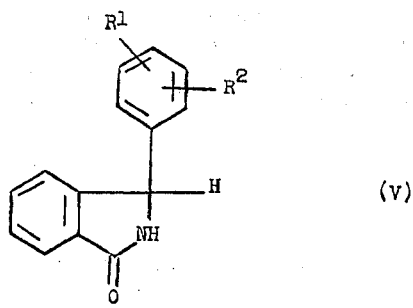

by treatment with triethyloxonium tetrafluoroborate in a solvent such as chlorinated hydrocarbons, e.g., methylene chloride, conveniently at a temperature of from about 20° to 30°C for about 2–16 hours.

The pharmaceutically active isomers of the compounds of formula (I) in resolved form may conveniently be prepared by the following reaction scheme:

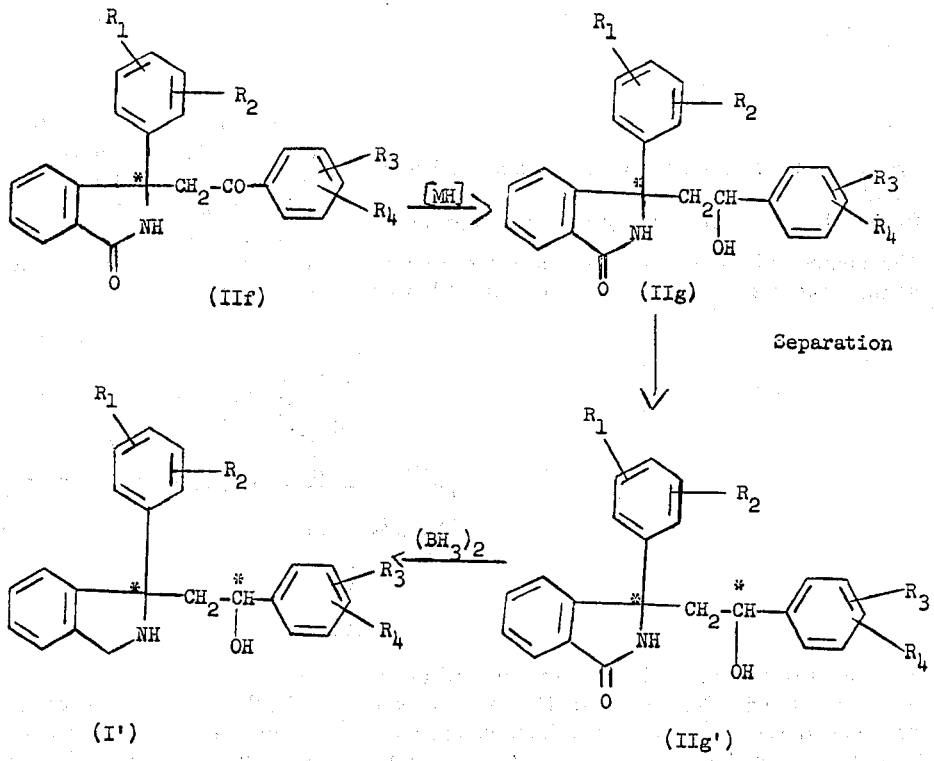

where $R_1$, $R_2$, $R_3$, $R_4$, [MH] and the proviso are as defined above.

The asterisks indicate that the isomer is present in essentially chiral form, i.e., in about 95 percent by weight or greater optically pure form.

The reduction of the compound of formula (IIf) is carried out in the same manner as the reduction of compound (IIc) above and leads to a mixture of two isomers, the nature of which will depend on the initial isomer of the compound (IIf).

The resulting isomeric mixture (IIg) is separated into individual isomers (IIg') in the second stage of the process, employing conventional techniques, e.g. column chromatography.

In the final stage of the process, the separated isomer of formula (IIg') is reduced with diborane in an inert organic solvent in the same manner as the reduction of the compounds of formula (II) above is carried out.

The resulting products may be isolated and purified using conventional techniques. The above process is particularly useful in preparing the compounds of formula (I) in which $R_3$ is in the para position.

The compounds of formula (IIf) may be produced in accordance with the following reaction scheme:

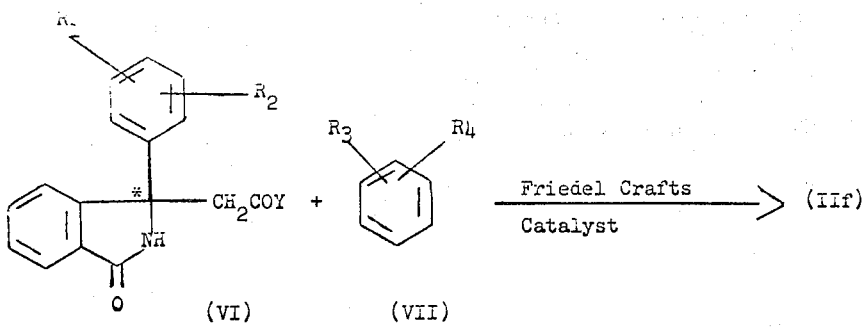

where

Y is halo having an atomic weight of about 35 to 80 and $R_1$, $R_2$, $R_3$, $R_4$ and the proviso are as set out above.

The compounds of formula (IIf) are prepared by treating the corresponding isomer of formula (VI) with a compound of formula (VII) in a solvent and in the presence of a Friedel Crafts catalyst. The particular solvent used in the reaction is not critical; but halogenated alkanes such as methylene dichloride, ethylene dichloride and the like, alkane such as hexane or heptane, ethers such as diethyl ether, tetrahydrofuran and the like are preferred, and excess reactant of formula (VII) is especially preferred. The Friedel Crafts catalyst used can be any of the conventional Friedel Crafts catalysts, for example, ferric chloride, stannic chloride, boron trifluoride, zinc chloride and especially aluminum trichloride. Although the temperature of the reaction is not critical, it is preferred that the reaction be run at temperatures between about −70° to 100°C, preferably between −50° to 30°C and more especially between −50° to 0°. The reaction can be carried out in an inert atmosphere such as already indicated and the reaction should be run for from about 30 minutes to 20 hours. The product is separated by conventional techniques, e.g., chromatography.

It will be appreciated that compound (IIc) in which Z is —CO— and A is hydrogen can be prepared by the above process by using the racemic form of compound (VI).

The present invention also encompasses the levo and dextro acid halides of formula (VI) which are prepared by halogenating the respective levo or dextro acid (VIII) with an inorganic acid halide, e.g., $SOCl_2$, $PCl_3$, or $SOBr_2$. The reaction is illustrated in the following scheme using a thionyl halide, the preferred halogenating agent.

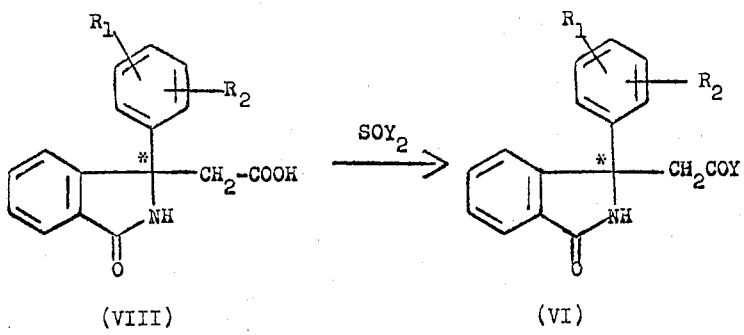

where

Y, $R_1$ and $R_2$ are as set out above.

The reaction is carried out in excess halogenating agent or inert solvent. The preferred inert solvents are benzene, toluene, pentane, hexane, heptane, methylene dichloride, chloroform and the like, especially ethylene dichloride. Although the time and temperature of the reaction are not critical, it is preferred that the reaction be run for approximately 30 minutes to 24 hours at a temperature between about 30°C. and 125°C., and especially at the reflux temperature of the system. It is also preferred that an N,N-di lower alkyl aliphatic acid amide, such as dimethyl acetamide or dimethylformamide be added to the reaction mixture to facilitate the reaction. One of the above inert atmospheres may also be used. The acid halide may be recovered by conventional techniques, e.g., evaporation or distillation.

The racemic form of compound (VI) can be prepared by the above procedure using compound (VIIIa) below, the racemic form of compound (VIII).

The compounds of formula (VIII) are novel and are included within the scope of this invention, and may be prepared in accordance with the following reaction scheme:

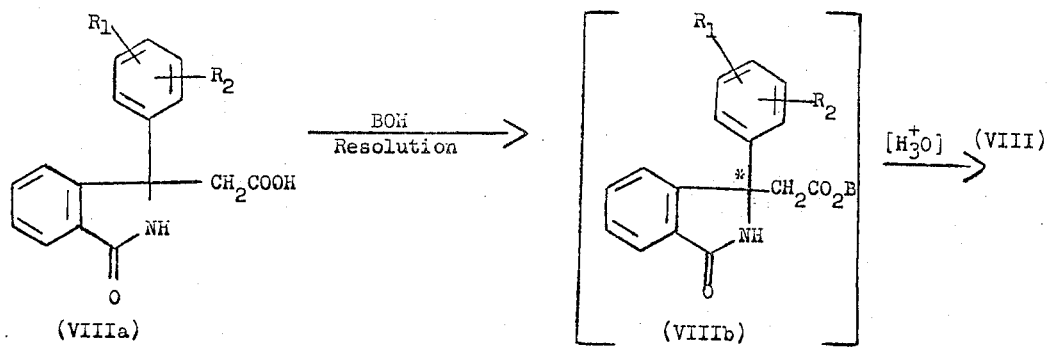

where
  BOH is an optically active base and
  $R_1$ and $R_2$ are as defined above.

The compounds of formula (VIII) are prepared by resolution and decomposing of the diastereoisomeric salts (VIIIb) formed by treating the compound of formula (VIIIa) with an optically active base in an inert solvent. The optically active base can be any of the standard basic resolving agents, such as cinchonine cinchonidine, quinine, strychnine, morphine and the like, especially brucine. the solvent used can be any inert solvent, preferably lower alkanols such as methanol, ethanol, etc., acetone, tetrahydrofuran and the like, especially methanol. Although the temperature of the reaction is not critical it is preferred that the reaction be carried out at from about 15° to 150°C. preferably 20° to 30°C. The time of the reaction is not critical and can range from few minutes to several hours. The diastereoisomers (VIIIb) are resolved by conventional techniques, e.g., fractional crystallization.

The decomposition of compound (VIIIb) to the optically active acid (VIII) is carried out by treating the isolated diastereoisomer of formula (VIIIb) with an acid in an inert aqueous solvent. The particular acid used is not critical and inorganic acids such as hydrochloric acid, sulfuric acid and the like or organic acids such as trifluroacetic acid can be used. The preferred acids are the inorganic acids, especially hydrochloric acid. The particular solvent used and the temperature and time condition for the reaction are not critical and are the same as in the preparation of the diastereoisomers salts above. The product (VIII) is recovered by conventional techniques, e.g., precipitation and recrystallization.

The compounds of formula (VIIIa) are prepared by the following reaction scheme:

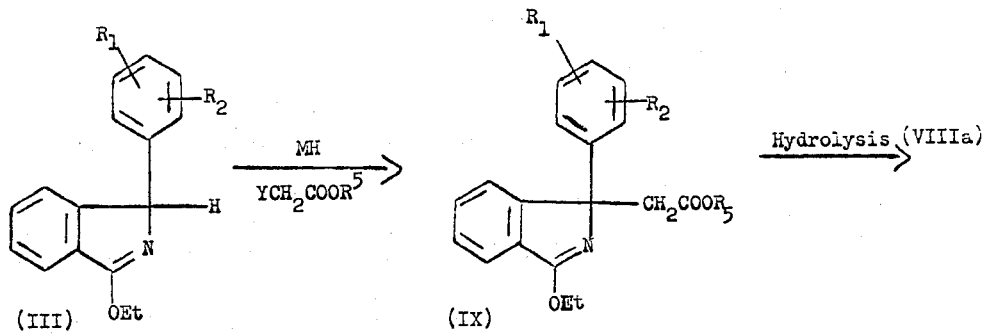

where
  MH is an alkali metal hydride
  $R_5$ is lower alkyl having 1 to 4 carbon atoms and
  Y, $R_1$ and $R_2$ are as set out above.

The compounds of formula (VIIIa) are prepared by treating a compound of formula (III) with an alkali metal hydride followed by a halo-acetic acid ester in an inert solvent and hydrolyzing the ester (IX) obtained. The haloacetic acid ester can be either bromoacetic acid ester or chloroacetic acid ester, but the former is preferred. The alkali metal hydride is preferably sodium hydride or potassium hydride. The particular inert solvent used is not critical but dimethylformamide is particularly preferred. The temperature is not critical, but the process is preferably carried out at a temperature of from about 0° to 80°C, especially 20° to 50°C. The reaction can be carried out in one of the above inert atmospheres, and the time may vary widely and is usually in the range of 1 to 24 hours. Recovery of the compounds (IX) may be effected using conventional techniques eg. evaporation, extraction, etc.

The hydrolysis of the ester (IX) to the acid (VIIIa) is carried out using an acid or base hydrolyzing agent in an aqueous solvent. The acidic hydrolyzing agents are the same as those used above in the decomposition of compound (VIIIb) and the basic hydrolyzing agent can be any of the standard basic hydrolyzing agents preferably potassium hydroxide or sodium hydroxide. The aqueous solvent can be water or water plus a water miscible organic solvent such as the lower alcohols having 1 to 4 carbon atoms especially methanol, ethanol and the like. Although the temperature is not critical, it is preferred that the reaction be carried out at a temperature of from 20° to 150°, especially between 50° to 80°. The acid (VIIIa) is recovered by conventional techniques, for example, evaporation or precipitation.

Many of the compounds of formulas (IV), (V) and (VII) are known and are readily prepared according to methods disclosed in the literature. Compounds of formulas (IV), (V) and (VII) which are not specifically disclosed may be prepared by methods analogous to those in the literature from known starting materials.

The compounds of formula (I) and (Ia) are useful because they possess pharmacological activity in animals. In particular, compounds (I) and (Ia) are useful as hypolipidemic agents in the treatment of lipidemia, in particular, hyperlipoproteinemia, as indicated by the fall in cholesterol levels in male albino Wistar rats weighing 110 to 130 g. initially. The rats are maintained on drug-free laboratory chow diet for seven days and then devided into groups of 8 to 10 animals. Each group, with the exception of the control, is then given orally 30 milligrams per kilogram of body weight per diem of the compound for six days. At the end of this period, the animals are anesthetized with sodium hexobarbital and bled from the carotid arteries. Serum or plasma samples are collected and 1.0 ml. of serum is added to 9.0 ml, redistilled isopropanol. Two autoanalyzer cupsful of a mixture of zeolite-copper hydroxide and Lloydds reagent (Kersler, E., and Lederer, H. 1965, Technicon Symposium, Madiad Inc., New York, 345–347) are added, and the mixture is shaken for 1 hour. Cholesterol levels are determined using this sample by the standard Technicon N 24A (cholesterol) methodology. The mean serum cholesterol levels are then computed and the hypocholesterolemic activity is expressed as the fall in cholesterol levels as a percentage of the control level.

For such usages, compounds (I) and (Ia) may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions and the like, e.g., a sterile injectable aqueous suspension. These pharmaceutical preparations may contain up to about 90 percent of the active ingredient in combination with the carrier or adjuvant.

Furthermore, these compounds of formula (I) and (Ia) may be similarly administered in the form of their non-toxic pharmaceutically acceptable acid addition salts. Such salts possess the same order of activity as the free base, are readily prepared by reacting the base with an appropriate acid and, accordingly, are included within the scope of the invention. Representative of such salts are the mineral acid salts, such as the hydrochloride, hydrobromide, sulfate, phosphate and the like and the organic acids salts, such as the succinate, benzoate, acetate, p-toluenesulfonate, benzene-sulfonate, maleate, malate, tartrate, methanesulfonate, cyclohexylsulfamate pyroglutamate and the like.

The cholesterol reducing effective dosage of active ingredient employed in the treatment of lipidemia may vary depending on the particular compound employed and the severity of the condition being treated. However, in general, satisfactory results are obtained when the compounds (I) and (Ia) are administered at the daily dosage of from about 0.5 milligrams to about 100 milligrams per kilogram of animal body weight, preferably given in divided doses two to four times daily, or in sustained release form. For most large mammals, the total daily dosage is from about 30 to about 1,500 milligrams. Dosage forms suitable for internal use comprise from about 7.5 to about 750 milligrams of the active compounds in intimate admixture with a solid or liquid pharmaceutically acceptable carrier or diluent.

The preferred pharmaceutical compositions from the standpoint of preparation and ease of administration are solid compositions, particularly hardfilled capsules and tablets containing from about 200 to 500 milligrams of the active ingredient.

A representative formulation suitable for administration is a tablet or capsule containing the ingredients indicated below which may be prepared by conventional techniques and are useful as a hypocholesterolemic agent at a dose of one tablet or capsule 2 to 4 times a day.

| Ingredient | Weight (mg) | |
|---|---|---|
| | tablet | capsule |
| (-)-1-(α-hydroxy-p-chlorophenethyl)-1-(p-chlorophenyl)-2,3-dihydroisoindole) | 250 | 250 |
| tragacanth | 10 | — |
| lactose | 247.5 | 250 |
| corn starch | 25 | — |
| talcum | 15 | — |
| magnesium stearate | 2.5 | — |
| Total | 500 mg. | 500 mg. |

The following pharmaceutical compositions are formulated with the indicated amount of active agent using conventional techniques. The injectable suspension and the oral liquid suspension represent formulations useful as unit doses and may be administered as a hypocholesterolemic agent. The injectable suspension is suitable for administration once or twice a day whereas the oral liquid suspension is suitable administered 2 to 4 times per day for this purpose.

| Ingredients | Weight (mg) | |
|---|---|---|
| | sterile injectable suspension | oral liquid suspension |
| (-)-1-(α-hydroxy-p-chlorophenethyl)-1-(p-chlorophenyl)-2,3-dihydroisoindole | 200 | 200 |
| sodium carboxy methyl cellulose USP | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, USP | — | 4.5 |
| propyl paraben, USP | — | 1.0 |
| polysorbate 80 (e.g. Tween 80), USP | — | 5 |
| sorbitol solution, 70% USP | — | 2,500 |
| buffer agent to adjust pH for desired stability | q.s. | q.s. |
| water | for injection, q.s. to 1 ml. | q.s. to 5 ml. |

EXAMPLE 1 a.

1-(p-chlorophenacyl)-1-(p-chlorophenyl)-3-ethoxy-1H-isoindole

In a 2.5 liter flask equipped with mechanical stirrer, condenser and dropping funnel is placed 5.4 g. of sodium hydride in 50 ml of absolute dimethyl formamide to which 54.5 g of 1-p-chlorophenyl-3-ethoxy-1H-isoindole in 500 ml of absolute dimethylformamide is then added dropwise. After completion of the addition, the mixture is stirred at room temperature for 2 hours and 47.0 g. of p-chlorophenacyl bromide in 500 ml of absolute dimethylformamide is then added dropwise. The mixture is stirred at room temperature overnight. The solvent is evaporated under reduced pressure and the residue dissolved in methylene chloride and washed with water to yield 1-(p-chlorophenacyl)-1-(p-chlorophenyl)-3-ethoxy-1H-isoindole, (mp 99°–101°C).

Following the above procedure but using an equivalent amount of a. phenacyl bromide;
b. p-fluorophenacyl bromide;
c. p-methoxyphenacyl bromide;

d. o-trifluoromethylphenacyl bromide;
e. m-trifluoromethylphenacyl bromide;
f. m-fluorophenacyl bromide;
g. o-fluorophenacyl bromide;
h. p-trifluoromethylphenacyl bromide;
i. 3,4-dichlorophenyl bromide;
j. p-methylphenacyl bromide;
k. o-chlorophenacyl bromide or
l. m-chlorophenacyl bromide in place of the p-chlorophenacyl bromide used therein, there is obtained:

a. 1-phenacyl-1-(p-chlorophenyl)-3-ethoxy-1H-isoindole:
b. 1-(p-fluorophenacyl)-1-(p-chlorophenyl)-3-ethoxy-1H-isoindole;
c. 1-(p-methoxyphenacyl)-1-(p-chlorophenyl)-3-ethoxy-1H-isoindole;
d. 1-(o-trifluoromethylphenacyl)-1-(p-chlorophenyl)-3-ethoxy-1H-isoindole;
e. 1-(m-trifluoromethylphenacyl)-1-(p-chlorophenyl)-3-ethoxy-1H-isoindole;
f. 1-(m-fluorophenacyl)-1-(p-chlorophenyl)-3-ethoxy-1H-isoindole;
g. 1-(o-fluorophenacyl)-1-(p-chlorophenyl)-3-ethoxy-1H-isoindole;
h. 1-(p-trifluoromethylphenacyl)-1-(p-chlorophenyl)-3-ethoxy-1H-isoindole;
1-(3,4-dichlorophenacyl)-1-(p-chlorphenyl)-3-ethoxy-1H-isoindole;
j. 1-(p-methylphenacyl)-1-(p-chlorophenyl)-3-ethoxy-1H-isoindole;
k. 1-(o-chlorophenacyl)-1-(p-chlorophenyl)-3-ethoxy-1H-isoindole or
l. 1-(m-chlorophenacyl)-1-(p-chlorophenyl)-1-ethoxy-1H-isoindole, respectively.

b)
1-(α-hydroxy-p-chlorophenethyl)-1-(p-chlorophenyl)-2,3-dihydroisoindole.

To 22.5 g of 1-(p-chlorophenacyl)-1-(p-chlorophenyl)-3-ethoxy-1H-isoindole dissolved in 100 ml of anhydrous tetrahydrofuran and cooled with icebath is added dropwise 100 ml of a commercial solution of 1 molar diborane in tetrahydrofuran. The solution is stirred for two hours at room temperature after which the solvent is evaporated under reduced pressure. Addition of 100 ml of water is followed by extraction with chloroform, to yield 1-(α-hydroxy-p-chlorophenethyl)-1-(chlorophenyl)-2,3-dihydroisoindole. m.p.157°–160°C.

The 1-(α-hydroxy-p-chlorophenethyl)-1-(p-chlorophenyl)-2,3-dihydroisoindole of this example is an effective hypocholesterolemic agent when administered orally at a dosage of 250 milligrams twice a day.

Following the above procedure, but using an equivalent amount of a. 1-phenacyl-1-(p-chlorophenyl)-3-ethoxy-1H-isoindole;
b. 1-(p-fluorophenacyl)-1-(p-chlorophenyl)-3-ethoxy-1H-isoindole;
c. 1-(p-methoxyphenacyl)-1-(p-chlorophenyl)-3-ethoxy-1H-isoindole;
d. 1-(o-trifluoromethylphenacyl)-1-(p-chlorophenyl)-3-ethoxy-1H-isoindole;
e. 1-(m-trifluoromethylphenacyl)-1-(p-chlorophenyl)-3-ethoxy-1H-isoindole;
f. 1-(m-fluorophenacyl)-1-(p-chlorophenyl)-3-ethoxy-1H-isoindole;
g. 1-(o-fluorophenacyl)-1-(p-chlorophenyl)-3-ethoxy-1H-isoindole;
h. 1-(p-trifluoromethylphenacyl)-1-(p-chlorophenyl)-3-ethoxy-1H-isoindole;
i. 1-(3,4-dichlorophenacyl)-1-(p-chlorophenyl)-3-ethoxy-1H-isoindole;
j. 1-(p-methylphenacyl)-1-(p-chlorophenyl)-3-ethoxy-1H-isoindole;
k. 1-(o-chlorophenacyl)-1-(p-chlorophenyl)-3-ethoxy-1H-isoindole or
l. 1-(m-chlorophenacyl)-1-(p-chlorophenyl)-3-ethoxy-1H-isoindole in place of the 1-(p-chlorophenacyl)-1-(p-chlorophenyl)-3-ethoxy-1H-isoindole used therein there is obtained:

a. 1-(α-hydroxyphenethyl)-1-(p-chlorophenyl)-2,3-dihydroisonidole (m.p. 139°–140°C);
b. 1-(α-hydroxy-p-fluorophenethyl)-1-(p-chlorophenyl)-2,3-dihydroisoindole (m.p. 154°–155°C);
c. 1-(α-hydroxy-p-methoxyphenethyl)-1-(p-chlorophenyl)-2,3-dihydroisoindole (m.p. 123°–125°C);
d. 1-(α-hydroxy-o-trifluoromethylphenethyl)-1-(p-chlorophenyl)-2,3-dihydroisoindole;
e. 1-(α-hydroxy-m-trifluoromethylphenethyl)-1-(p-chlorophenyl)12,3-dihydroisoindole;
f. 1-(α-hydroxy-m-fluorophenethyl)-1(-p-chlorophenyl)-2,3-dihydroisoindole;
g. 1-(α-hydroxy-o-fluorophenethyl)-1-(p-chlorophenyl)-2,3-dihydroisoindole;
h. 1-(α-hydroxy-p-trifluoromethylphenethyl)-1-(p-chlorophenyl)-2,3-dihydroisoindole;
i. 1-(α-hydroxy-3,4-dichlorophenethyl)-1-(p-chlorophenyl)-2,3-dihydroisoindole; (m.p. 140°–142°C);
j. 1-(α-hydroxy-p-methylphenethyl)-1-(p-chlorophenyl)-2,3-dihydroisoindole
k. 1-(α-hydroxy-o-chlorophenethyl)-1-(p-chlorophenyl)-2,3-dihydroisoindole or
l. 1-(α-hydroxy-m-chlorophenethyl)-1-(p-chlorophenyl)-2,3-dihydroisoindole, respectively.

EXAMPLE 2

When essentially the same procedure as in example I is carried out using an equivalent amount of 1-phenyl-3-ethoxy-1H-isoindole or 1-(3,4-dichlorophenyl)-3-ethoxy-1H-isoindole in place of the 1-(p-chlorophenyl)-3-ethoxy-1H-isoindole used therein, there is obtained after treatment with sodium hydride and p-chlorophenacyl bromide, 1-(p-chlorophenacyl)-1-phenyl-3-ethoxy-1H-isoindole or 1-(p-chlorophenacyl)-1-(3,4-dichlorophenyl)-3-ethoxy-1H-isoindole respectively; and after treatment of these products with diborane, there is obtained 1-(α-hydroxy-p-chlorophenethyl)-1-phenyl-2,3-dihydroisoindole or 1-(α-hydroxy-p-chlorophenethyl)-1-(3,4-dichlorophenyl)-2,3-dihydroisoindole (m.p. 125°–126°C) respectively.

EXAMPLE 3

When the 1-(α-hydroxy-p-chlorophenethyl)-1-phenyl-2,3-dihydroisoindole of example 2 is dissolved in methanol and treated with a methanolic solution of maleic acid, there is obtained 1-(α-hydroxy-p-chlorophenethyl)-1-phenyl-2,3-dihydroisoindole maleate (m.p. 151°–153°C).

Following essentially the above procedure, but using in place of the 1-(α-hydroxy-p-chlorophenethyl)-1-phenyl-2,3-dihydroisoindole an equivalent amount of a. 1-(α-hydroxy-o-trifluoromethylphenethyl)-1-(p-chlorophenyl)-2,3-dihydroisoindole;
b. 1-(α-hydroxy-m-trifluoromethylphenethyl)-1-(p-chlorophenyl)-2,3-dihydroisoindole;
c. 1-(α-hydroxy-m-fluorophenethyl)-1-(p-chlorophenyl)-2,3-dihydroisoindole;
d. 1-(α-hydroxy-o-fluorophenethyl)-1-(p-chlorophenyl)-2,3-dihydroisoindole;
e. 1-(α-hydroxy-p-trifluoromethylphenethyl)-1-(p-chlorophenyl)-2,3-dihydroisoindole;
f. 1-(α-hydroxy-o-chlorophenethyl)-1-(p-chlorophenyl)-2,3-dihydroisoindole;
g. 1-(α-hydroxy-m-chlorophenethyl)-1-(p-chlorophenyl)-2,3-dihydroisoindole or
h. 1-(α-hydroxy-p-methylphenethyl)-1-(p-chlorophenyl)-2,3-dihydroisoindole, there is obtained:

a. 1-(α-hydroxy-o-trifluoromethylphenethyl)-2,3-dihydroisoindole maleate (m.p. 182°–184°C);
b. 1-(α-hydroxy-m-trifluoromethylphenethyl)-1-(p-chlorophenyl)-2,3-dihydroisoindole maleate (m.p. 162°–164°C);
c. 1-(α-hydroxy-m-fluorophenethyl)-1-(p-chlorophenyl)-2,3-dihydroisoindole maleate (m.p. 192°–194°C);
d. 1-(α-hydroxy-o-fluorophenethyl)-1-(p-chlorophenyl)-2,3-dihydroisoindole maleate (m.p. 185°–186°C);
e. 1-(α-hydroxy-p-trifluoromethylphenethyl)-1-(p-chlorophenyl)-2,3-dihydroisoindole maleate (m.p. 178°–180°C);
f. 1-(α-hydroxy-o-chlorophenethyl)-1-(p-chlorophenyl)-2,3-dihydroisoindole maleate (183°–185°C);
g. 1-(α-hydroxy-m-chlorophenethyl)-1-(p-chlorophenyl)-2,3-dihydroisoindole maleate (170°–172°C), or
h. 1-(α-hydroxy-p-methylphenethyl)-1-(p-chlorophenyl)-2,3-dihydroisoindole (m.p. 169°–170°C), respectively.

EXAMPLE 4

Step A:
1-(α-hydroxy-p-chlorophenethyl)-1-(p-chlorophenyl)-3-ethoxy-1H-isoindole To 10.4 g of 1-(p-chlorophenacyl)-1-(p-chlorophenyl)-3-ethoxy-1H-isoindole in 100 ml of absolute ethanol, 3.0 g of sodium borohydride are added. The mixture is stirred at room temperature over night. The solvent is then evaporated under reduced pressure, following which the residue is dissolved in methylene chloride, washed with water until neutral, and dried over potassium carbonate. The solvent is evaporated leaving 11.5 g of a solid (m.p. 120°–123°) which is chromatographed on silica gel to yield two racemic isomers: Mixture A and Mixture B:

Mixture A: m.p. 144°–146° (6.3 g) and
Mixture B: m.p. 136°–138° (1.8 g)

Step B:
1-(α-hydroxy-p-chlorophenethyl)-1-(p-chlorophenyl)-2,3-dihydroisoindole.

In 20 ml of tetrahydrofuran, 2.1 g of 1-(α-hydroxy-p-chlorophenethyl)-1-(p-chlorophenyl)-3-ethoxy-1H-isoindole, (Mixture A: m.p. 144°–146°) is reduced with 6 ml of commercial diborane in tetrahydrofuran solution at room temperature over night. Initial work-up yields the title product; m.p. 159°–162°C (m.p. of the maleic acid addition salt 191°–192°C).

When the same reduction is carried out with Mixture B of Step A (m.p. 136°–138°C), the corresponding product is isolated as the maleic acid addition salt. m.p. 119°–121°C. This product is inactive.

EXAMPLE 5

Step A:
3-(α-hydroxy-p-chlorophenethyl)-3-(p-chlorophenyl)-phthalimidine

One gram of 1-(α-hydroxy-p-chlorophenethyl)-1-(p-chlorophenyl)-3-ethoxy-1H-isoindole (Mixture A, Step A of example 4), is heated in 25 ml of 95% ethanol and 1 ml of 2N hydrochloric acid at 55°–60°C for 90 minutes. After evaporation of the solvent, the residue is filtered and washed with water and recrystallized from methylene chloride/hexane to yield the title racemic isomer A: m.p. 211°–212°.

Step B:
1-(α-hydroxy-p-chlorophenethyl)-1-(p-chlorophenyl)-2,3-dihydroisoindole.

When the product from Mixture A of Step A of this example is treated with diborane in accordance with the process of Step B of example 4, there is again obtained 1-(α-hydroxy-p-chlorophenethyl)-1-(p-chlorophenyl)-2,3-dihydroisoindole (m.p. 159°–162°C).

EXAMPLE 6

Step A:
3-(p-chlorophenacyl)-3-(p-chlorophenyl)-phthalimidine.

When the acid hydrolysis procedure of Step A of example 5 is carried out using 1-(p-chlorophenacyl-1-(p-chlorophenyl)-3-ethoxy-1H-isoindole of example 1, there is obtained 3-(p-chlorophenacyl)-3-(p-chlorophenyl)-phthalimidine (m.p. 192°–194°C).

Step B:
3-(α-hydroxy-p-chlorophenethyl)-3-(p-chlorophenyl)-phthalimidine.

When the product of Step A is treated with sodium borohydride using the process of Step A of Example 4, there is obtained after chromatography 3-(α-hydroxy-p-chlorophenethyl)-3-(p-chlorophenyl)-phthalimidine (m.p. 211°–212°C).

Step C:
1-(α-hydroxy-p-chlorophenethyl)-1-(p-chlorophenyl)-2,3-dihydroisoindole.

When the product of Step B of this example is treated with diborane using the process of Step B of example 4, there is obtained 1-(α-hydroxy-p-chlorophenethyl)-1-(p-chlorophenyl)-2,3-dihydroisoindole (m.p. 159°–161°C)

EXAMPLE 7

1-(α-hydroxy-p-chlorophenethyl)-1-(p-chlorophenyl)-2,3-dihydroisoindole.

When the product of Step A from example 6 is treated with diborane using the process of Step B of example 4, there is obtained 1-(α-hydroxy-p-chlorophenethyl)-1-(p-chlorophenyl)-2,3-dihydroisoindole.

EXAMPLE 8

Step A: 1-(p-chlorophenyl)-3-oxo-isoindoline acetic acid.

Into a flask equipped with a mechanical stirrer, condenser and dropping funnel is charged under nitrogen 13 grams of sodium hydride in 250 ml. of anhydrous dimethyl formamide. To this, 136 grams of 1-(p-chlorophenyl)-3-ethoxy-1H-isoindole in 500 ml of absolute DMF is added dropwise. After completion of the addition, the mixture is stirred at room temperature for 2 hours following which 77.5 grams of methylbromoacetate is added dropwise. After standing at room temperature over night, the solvent is evaporated under reduced pressure and the residue is dissolved in methylene chloride. This solution is washed with water and after separation, the organic phase is dissolved in 850 ml of methanol and warmed on the water bath 2 hours with 750 ml of 2N hydrochloric acid. The solvent is evaporated under reduced pressure and the residue is dissolved in 2N sodium hydroxide. After extracting with ether, a recemic mixture of the (+) and (−) isomers of 1-(p-chlorophenyl)-3-oxo-isoindoline-acetic acid is precipitated from the aqueous layer by the addition of 2N hydrochloric acid (m.p. 234°–236°).

To 222 grams of the racemic mixture prepared as above in 2,500 ml of methanol is added 295.0 grams of brucine in 800 ml. of methanol. From the solution, 260 g. of a solid complex precipitates which is filtered off, suspended in 500 ml. of methanol and acidified with 160 ml of 2N hydrochloric acid. On cooling, the (+) acid crystallizes out, is filtered and then recrystallized from methanol with a melting point of 216°–217° and an optical rotation of $\alpha_D$=+253°. (The optical rotations in this example are measured at a concentration of 10mg/ml in ethanol at 23°C using the sodium D-line).

The solution containing the (−) acid complexed with brucine is evaporated to an oil, which is dissolved in methanol and treated with 2N hydrochloric acid. The solid is filtered off and recrystallized from methanol (mp. 215°–216°; $\alpha_D$=−244°).

Following essentially the above procedure, but using an equivalent amount of 1-phenyl-3-ethoxy-1H-isoindole or 1-(3,4-dichlorophenyl)-3-ethoxy-1H-isoindole in place of the 1-(p-chlorophenyl)-3-ethoxy-1H-isoindole used therein, there is obtained the (+) and (−) isomers of 1-phenyl-3-oxo-isoindoline-acetic acid or 1-(3,4-dichlorophenyl)-3-oxo-isoindoline-acetic acid respectively.

Step B:
(+)-3-(p-chlorophenacyl)-3-(p-chlorophenyl)-phthalimidine.

Thirty grams of the (+) acid above is treated with 60 ml. of thionylchloride under nitrogen in 300 ml. of dichloroethane and 5 drops of dimethylformamide. The mixture is refluxed for 30 minutes at 50° to 60° and the solvent is evaporated under reduced pressure. The crude acid chloride, (+)-1-(p-chlorophenyl)-3-oxo-isoindoline acetic acid chloride, is dissolved in 100 ml of dichloroethane and to this solution is added 48 gm. of chlorobenzene. The mixture is cooled to −50° and 26 grams of aluminuim chloride is added in small portions. After 2 hours, the mixture is allowed to warm to room temperature. The reactants are then poured on ice, extracted with methylene chloride, washed with sodium carbonate solution, dried and evaporated. The crude material (58 g) is dissolved in methylene chloride and ether is added to form a cloudy mixture. A seed crystal is added to crystallize the (+)-3-(p-chlorophenacyl)-3-(p-chlorophenyl)-phthalimidine, (mp. 171°–172°; $\alpha_D$=+332°).

The (−)-3-(p-chlorophenacyl)-3-(p-chlorophenyl)-phthalimidine (mp. 170°–172°; $\alpha_D$−331°) is obtained following the above procedure and chromatographing on silica; but using an equivalent amount of (−)-3-(p-chlorophenyl)-3-oxo-isoindoline-acetic acid in place of the (+)-1-(p-chlorophenyl)-3-oxo-isoindoline acetic acid to prepare the (−)-1-(p-chlorophenyl)-3-oxo-isoindoline acetic acid chloride.

Following the above procedure but using an equivalent amount of a. benzene;
fluorobenzene;
c. methoxybenzene;
d. trifluoromethylbenzene;
e. 3,4-dichlorobenzene or;
f. toluene in place of the chlorobenzene used therein, there is obtained the (+) and (−) isomers of a. 3-phenacyl-3-(p-chlorophenyl)-phthalimidine;
b. 3-(p-fluorophenacyl)-3-(p-chlorophenyl)-phthalimidine;
c. 3-(p-methoxyphenacyl)-3-(p-chlorophenyl)-phthalimidine;
d. 3-(p-trifluoromethylphenacyl)-3-(p-chlorophenyl)-phthalimidine;
e. 3-(3,4-dichlorophenacyl)-3-(p-chlorophenyl)-phthalimidine or
f. 3-(p-methylphenacyl)-3-(p-chlorophenyl)-phthalimidine respectively.

When the (+)-1-(p-chlorophenyl)-3-oxo-isoindoline-acetic acid of this example is replaced by an equivalent amount of the (+) or (−) isomer of 1-phenyl-3-oxo-isoindoline-acetic acid or 1-(3,4-dichlorophenyl)-3-oxo-isoindoline-acetic acid there is obtained the corresponding (+) or (−) isomers of 1-phenyl-3-oxo isoindoline-acetic acid chloride or 1-(3,4-dichlorophenyl)-3-oxo-isoindoline-acetic acid chloride before treatment with the chlorobenzene and the corresponding (+) or (−) isomer of 3-phenyl-3-(p-chlorophenacyl)-phthalimidine or 3-(3,4-dichlorophenyl)-3-(p-chlorophenacyl)-phthalimidine respectively after treatment with chlorobenzene.

Step C:
(+)-3-(α-hydroxy-p-chlorophenethyl)-3-(p-chlorophenyl)-phthalimidine

To 25 g. of (+)-3-(p-chlorophenacyl)-3-(p-chlorophenyl)-phthalimidine in 500 ml. of absolute ethanol under nitrogen and cooled in an ice bath, 3.0 g. of sodium borohydride are added. The mixture is stirred at room temperature for 2 hours. The solvent is then evaporated under reduced pressure, following which the residue is dissolved in methylene chloride, washed with water until neutral, and dried over potassium carbonate. The solvent is evaporated leaving 32 g. of crude product which is chromatographed on silica gel first with benzene then with increasingly stronger chloroform in benzene solution to yield the title product (231°–233°; $\alpha_D$=+182°)

Continue elution with chloroform yields a second isomer ($\alpha_D$=+79).

Following the above procedure and using (−)-3-(p-chlorophenacyl)-3-(p-chlorophenyl)-phthalimidine in place of the (+)isomer, there is obtained (−)-3-(α-hydroxy-p-chlorophenethyl)-3-(p-chlorophenyl)-phthalimidine (m.p. 231°–233°; $\alpha_D$=−184).

Again continued elution with chloroform yields a second isomer ($\alpha_D$=−79°).

Step D:
(−)-1-(α-hydroxy-p-chlorophenethyl)-1-(p-chlorophenyl)-2,3-dihydroisoindole.

In 100 ml. of dry tetrahydrofuran, 4.5 g. of (−)-3-(α-hydroxy-p-chlorophenethyl)-3-(p-chlorophenyl)-3-phthalimidine($\alpha_D$=−184), is cooled with ice and reduced with 30 ml of 1 molar commercial diborane in tetrahydrofuran solution. The mixture is left at 7°C for 2 days following which the solvent is evaporated and the product dissolved in methylene chloride. After washing with potassium carbonate and water and drying over potassium carbonate, chromatographing as above with benzene and chloroform yields the title product ($\alpha_D$=−71°).

The (−)-1-(α-hydroxy-p-chlorophenethyl)-1-(p-chlorophenyl)-2,3-dihydroisoindole of this example is an effective hypocholesterolemic agent when administered orally at a dosage of 250 milligrams twice a day.

When the same reduction is carried out with the (+) isomer of Step A, the corresponding (+)-1-(α-hydroxy-p-chlorophenethyl)-1-(p-chlorophenyl)-2,3-dihydroisoindole ($\alpha_D$=+65°) is obtained.

When the above process is carried out with isomer (α=+79) and isomer (α=−79), the products obtained are inactive isomers (α=−60) and (α=+59) respectively which are pharmaceutically inactive.

Following the above procedures, but using an equivalent amount of either the (+) or (−) isomer of a. 3-phenacyl-3-(p-chlorophenyl)-phthalimidine;
b. 3-(p-fluorophenacyl)-3-(p-chlorophenyl)-phthalimidine;
c. 3-(p-methoxyphenacyl)-3-(p-chlorophenyl)-phthalimidine;
d. 3-(p-trifluoromethylphenacyl)-3-(p-chlorophenyl)-phthalimidine;
e. 3-(3,4-dichlorophenacyl)-3-(p-chlorophenyl)-phthalimidine;
f. 3-(p-methylphenacyl)-3-(p-chlorophenyl)-phthalimidine;
g. 3-phenyl-3-(p-chlorophenacyl)-phthalimidine or
h. 3-(3,4-dichlorophenyl)-3-(p-chlorophenacyl)-phthalimidine, in place of the (+)-3-(p-chlorophenacyl)-3-(p-chlorophenyl)-phthalimidine used therein there is obtained after carrying out the process of Step C, the corresponding (+) or (−) isomers of a. 3-(α-hydroxyphenethyl)-3-(p-chlorophenyl)-phthalimidine;
b. 3-(α-hydroxy-p-fluorophenethyl-3-(p-chlorophenyl)-phthalimidine;
c. 3-(α-hydroxy-p-methoxyphenethyl)-3-(p-chlorophenyl)-phthalimidine;
d. 3-(α-hydroxy-p-trifluoromethylphenethyl)-3-(p-chlorophenyl)-phthalimidine;
e. 3-(α-hydroxy-3,4-dichlorophenethyl)-3-(p-chlorophenyl)-phthalimidine;
f. 3-(α-hydroxy-p-methylphenethyl)-3-(p-chlorophenyl)-phthalimidine;
g. 3-(α-hydroxy-p-chlorophenethyl)-3-phenyl-phthalimidine-phthalimidine or
h. 3-(α-hydroxy-p-chlorophenethyl)-3-(3,4-dichlorophenyl)-phthalimidine respectively, and the corresponding (+) or (−) isomers of a. 1-(α-hydroxyphenethyl)-1-(p-chlorophenyl)-2,3-dihydroisoindole;
b. 1-(α-hydroxy-p-fluorophenethyl-1-(p-chlorophenyl)-2,3-dihydroisoindole;
c. 1-(α-hydroxy-p-methoxyphenethyl)-1-(p-chlorophenyl)-2,3-dihydroisoindole
d. 1-(α-hydroxy-p-trifluoromethylphenethyl)-1-(p-chlorophenyl)-2,3-dihydroisoindole;
e. 1-(α-hydroxy-3,4-dichlorophenetnyl)-1-(p-chlorophenyl)-2,3-dihydroisoindole;
f. 1-(α-hydroxy-p-methylphenethyl)-1-(p-chlorophenyl)-2,3-dihydroisoindole;
g. 1-(α-hydroxy-p-chlorophenethyl)-1-phenyl-2,3-dihydroisoindole or
h. 1-(α-hydroxy-p-chlorophenethyl)-1-(3,4-dichlorophenyl)-2,3-dihydroisoindole, respectively after carrying out the process of Step D.

EXAMPLE 9

(−)-1-(α-hydroxy-p-chlorophenethyl)-1-(p-chlorophenyl)-2,3-dihydroisoindole

To a suspension of 48.0 grams (0.125 mol) of racemic 1-(α-hydroxy-p-chlorophenethyl)-1-(p-chlorophenyl)-2,3-dihydroisoindole from example 1 in 700 ml. of methanol there is added 19.1 g of D-(+)-pyroglutamic acid (D-(+)-2-pyrrolidone-5-carboxylic acid) of an estimated optical purity of 80 percent. The solution is filtered and the product (−)-1-(α-hydroxy-p-chlorophenethyl)-1-(p-chlorophenyl)-2,3-dihydroisoindole-D-(+)-pyroglutamate is precipitated by the addition of ether. The product is filtered off and dried (m.p. 180°–181°; $\alpha_D$=−5.24°; yield 28.0 g, 87 percent).

The free base is liberated by treating a methanol solution of the above salt with 2N sodium hyroxide and extracting with methylene chloride. The product is isolated as an amorphous foam ($\alpha_D$=−70.25°)

To 5.2 grams of the above free base in 5 ml. of methanol, 2.2 g. of 85 percent phosphoric acid is added following which ether is added to precipitate the phosphate salt of the title compound (m.p. 107°–109°; $\alpha_D$=+27.5°; yield 7.0 g).

The filtrate remaining above after the separation of the pyroglutamate of the title product is evaporated to dryness to precipitate (+)-1-(α-hydroxy-p-chlorophenethyl)-1-(p-chlorophenyl)-2,3-dihydroisoindole D-(+)-pyroglutamate.

When the above salt in methanol is treated with 2N NaOH and extracted with methylene chloride, the free base (+)-1-(α-hydroxy-p-chlorophenethyl)-1-(p-chlorophenyl)-2,3-dihydroisoindole is obtained as a foam. Treatment with L-(−)-pyroglutamic acid yields the salt ($\alpha_D$=+5.24) which on treatment with 2N NaOH again yields the pure (+)-1-(α-hydroxy-p-chlorophenethyl)-1-(p-chlorophenyl)-2,3-dihydroisoindole ($\alpha_D$=+70.25; phosphate salt $\alpha_D$=−27.5)

When the above process is carried out using an equivalent amount of a racemic mixture of 1-(α-hydroxy-3,4-dichlorophenethyl)-1-(p-chlorophenyl)-2,3-dihydroisoindole prepared as in example 1 in place of the racemic mixture of 1-(α-hydroxy-p-chlorophenethyl)-1-(p-chlorophenyl)-2,3-dihydroisoindole, there is obtained (−)-1-(α-hydroxy-3,4-dichlorophenyl)-1-(p-chlorophenyl)-2,3-dihydroisoindole ($\alpha_D$=−64.96; + D-pyroglutamic acid salt m.p. 165–168°C.; $\alpha_D$=−6.96) and (+)-1-(α-hydroxy-3,4-dichlorophenethyl)-1-(p-chlorophenyl)-2,3-dihydroisoindole ($\alpha_D$=+62.5).

What is claimed is:

1. A compound of the formula:

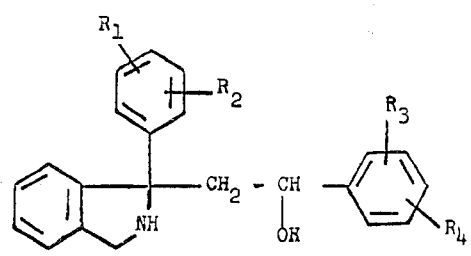

where

R$_1$ and R$_2$ each independently represent hydrogen or halo having an atomic weight of 19 to 36 and R$_3$ and R$_4$ each independently represents hydrogen, lower alkyl having 1 to 4 carbon atoms, lower alkoxy having 1 to 4 carbon atoms, halo having an atomic weight of 19 to 36 or trifluoromethyl provided that when both R$_3$ and R$_4$ are trifluoromethyl, they are not on adjacent carbon atoms; or a pharmaceutically acceptable acid addition salt thereof.

2. The compound of claim 1 which is 1-(α-hydroxy-p-chlorophenethyl)-1-(p-chlorophenyl)-2,3-dihydroisoindole.

3. The compound of claim 1 which is 1-(α-hydroxyphenethyl)-1-(p-chlorophenyl)-2,3-dihydroisoindole.

4. The compound of claim 1 which is 1-(α-hydroxy-p-fluorophenethyl)-1-(p-chlorophenyl)-2,3-dihydroisoindole.

5. The compound of claim 1 which is 1-(α-hydroxy-p-methoxyphenethyl)-1-(p-chlorophenyl)-2,3-dihydroisoindole.

6. The compound of claim 1 which is 1-(α-hydroxy-o-trifluoromethylphenethyl)-1-(p-chlorophenyl)-2,3-dihydroisoindole.

7. The compound of claim 1 which is 1-(α-hydroxy-m-trifluoromethylphenethyl)-1-(p-chlorophenyl)-2,3-dihydroisoindole.

8. The compound of claim 1 which is 1-(α-hydroxy-m-fluorophenethyl)-1-(p-chlorophenyl)-2,3-dihydroisoindole.

9. The compound of claim 1 which is 1-(α-hydroxy-o-fluorophenethyl)-1-(p-chlorophenyl)-2,3-dihydroisoindole.

10. The compound of claim 1 which is 1-(α-hydroxy-p-trifluoromethylphenethyl)-1-(p-chlorophenyl)-2,3-dihydroisoindole.

11. The compound of claim 1 which is 1-(α-hydroxy-3,4-dichlorophenethyl)-1-(p-chlorophenyl)-2,3-dihydroisoindole.

12. The compound of claim 1 which is 1-(α-hydroxy-p-chlorophenethyl)-1-phenyl-2,3-dihydroisoindole.

13. The compound of claim 1 which is 1-(α-hydroxy-p-chlorophenethyl)-1-(3,4-dichlorophenyl)-2,3-dihydroisoindole.

14. The compound of claim 1 which is 1-(α-hydroxy-o-chlorophenethyl)-1-(p-chlorophenyl)-2,3-dihydroisoindole.

15. The compound of claim 1 which is 1-(α-hydroxy-m-chlorophenethyl)-1-(p-chlorophenyl)-2,3-dihydroisoindole.

16. The compound of claim 1 which is 1-(α-hydroxy-p-methylphenethyl)-1-(p-chlorophenyl)-2,3-dihydroisoindole.

17. A pharmaceutically active compound of the formula

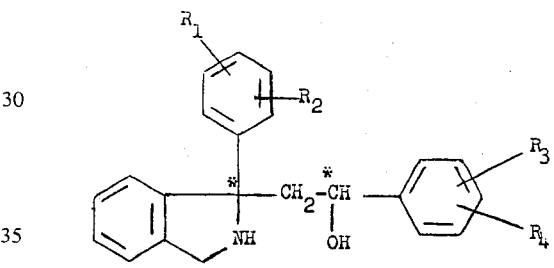

where

R$_1$, R$_2$, R$_3$, R$_4$ and the proviso are as set out in claim 1.

18. The compound of claim 17 which is (+)-1-(α-hydroxy-p-chlorophenethyl)-1-(p-chlorophenyl)-2,3-dihydroisoindole.

19. The compound of claim 17 which is (−)-1-(α-hydroxy-p-chlorophenethyl)-1-(p-chlorophenyl)-2,3-dihydroisoindole.

20. A process for preparing the compounds of claim 1 which comprises reducing a compound of the formula:

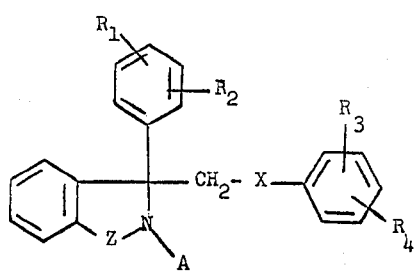

with diborane in an inert solvent where

X is —CO— or —CHOH—;

Z is —CO— or

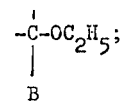

23

A is hydrogen or
AB together represent a carbon to nitrogen double bond when Z is

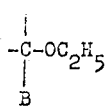

and
$R_1$, $R_2$, $R_3$, $R_4$ and the proviso are as set out in claim 1.

21. The process according to claim 20 in which X is —Co—, Z is

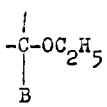

and AB represents a carbon to nitrogen double bond.

22. A compound of the formula

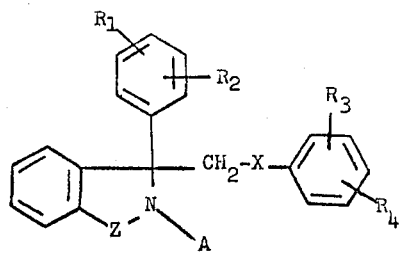

where
X, Z, $R_1$, $R_2$, $R_3$, $R_4$ and the proviso are as set out in claim 20.

23. A compound of the formula

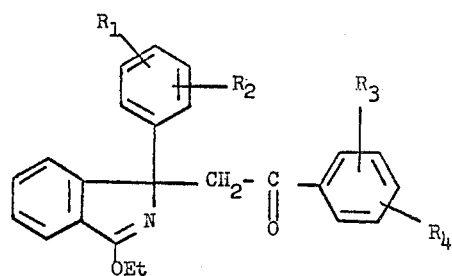

where
$R_1$, $R_2$, $R_3$, $R_4$ and the proviso are as set out in claim 20.

24. A process for preparing a compound of the formula

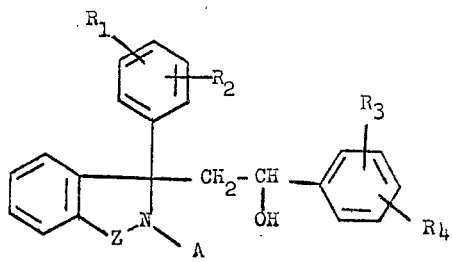

24 which comprises treating a compound of the formula

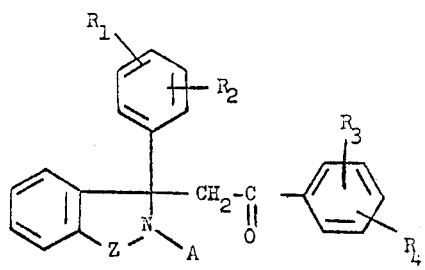

with an alkali metal hydride reducing agent in an inert solvent, where
Z, $R_1$, $R_2$, $R_3$, $R_4$ and the proviso are as set out in claim 20.

25. A compound of formula

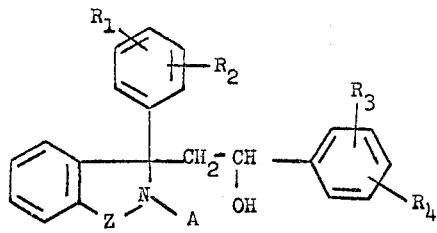

where
Z, $R_1$, $R_2$, $R_3$, $R_4$ and the proviso are as set out in claim 23.

26. A process for preparing a compound of the formula

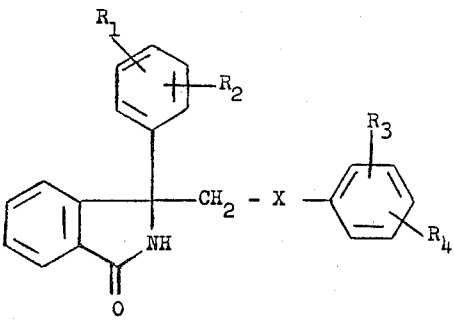

which comprises hydrolyzing a compound of the formula

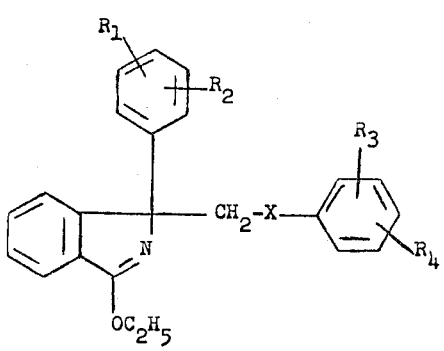

in an inert solvent under acid conditions at a pH below 3, where
X, $R_1$, $R_2$, $R_3$, $R_4$ and the proviso are as set out in claim 22.

27. A compound of the formula

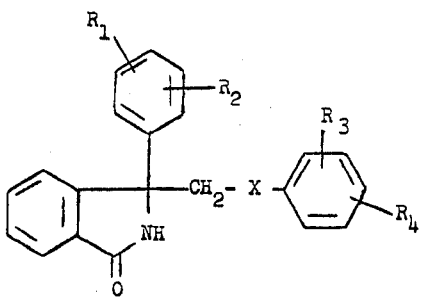

where
X, $R_1$, $R_2$, $R_3$, $R_4$ and the proviso are as set out in claim 25.

28. A process for preparing the compounds of claim 17 which comprises reducing a compound of the formula:

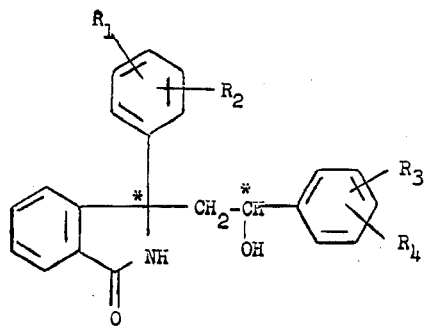

with diborane in an inert solvent where
$R_1$, $R_2$, $R_3$, $R_4$ and the proviso are as set out in claim 17.

29. A compound of the formula:

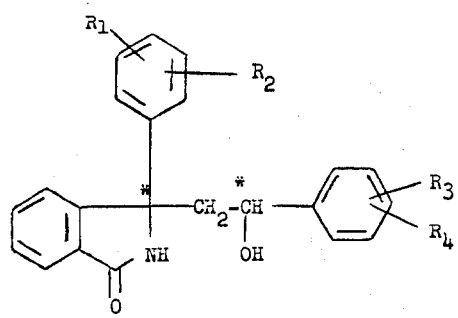

where
$R_1$, $R_2$, $R_3$, $R_4$ and the proviso are as set out in claim 27.

30. A process for preparing a compound of the formula

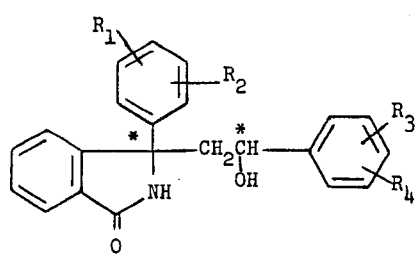

which comprises treating a compound of the formula

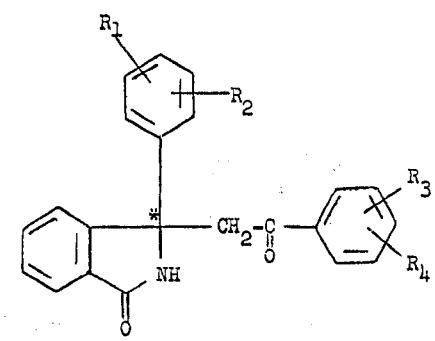

with an alkali metal reducing agent in an inert solvent, where
$R_1$, $R_2$, $R_3$, $R_4$ and the proviso are as set out in claim 28 to obtain a product of the formula:

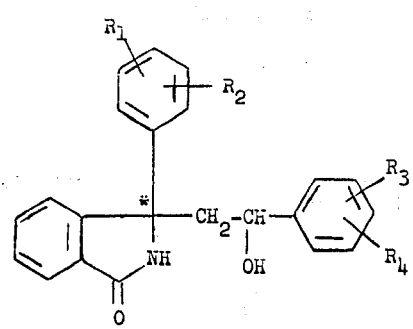

and separating the product into its component isomers.

31. A compound of the formula

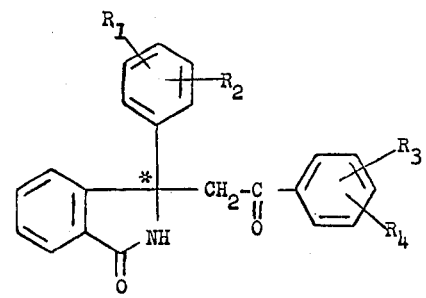

where
$R_1$, $R_2$, $R_3$, $R_4$ and the proviso are as set out in claim 29.

32. A process for preparing a compound of the formula

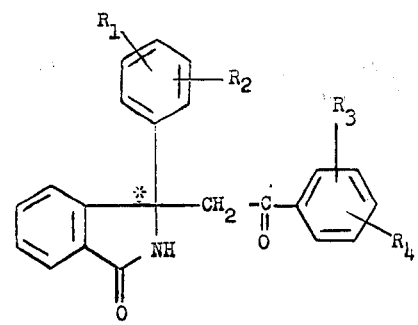

which comprises treating a compound of the formula

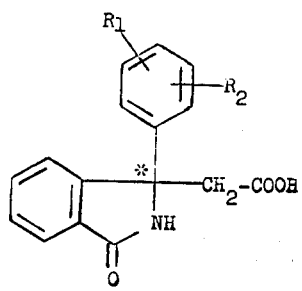

with a halogenating agent to form an intermediate of the formula

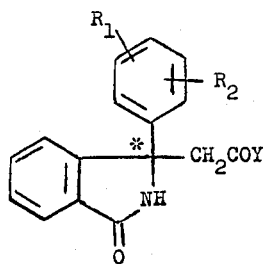

and thereafter treating said intermediate with a compound of the formula

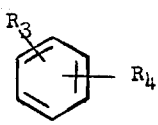

in an inert solvent in the presence of a Friedel Craft catalyst where
Y is halo having an atomic weight of about 35 to 80 and
$R_1$, $R_2$, $R_3$, $R_4$ and the proviso are as set out in claim 30.

33. A compound of the formula

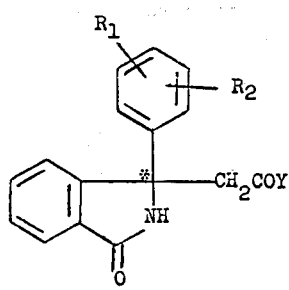

where
Y, $R_1$, $R_2$ and the proviso are set out in claim 31.

34. A compound of the formula

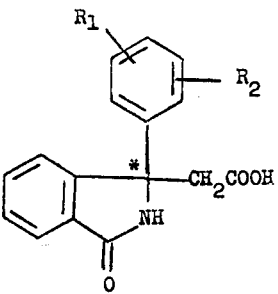

where
$R_1$, $R_2$ and the proviso are as set out in claim 31.

35. A process for preparing enantiomers of claim 17, which comprises reducing a compound of the formula:

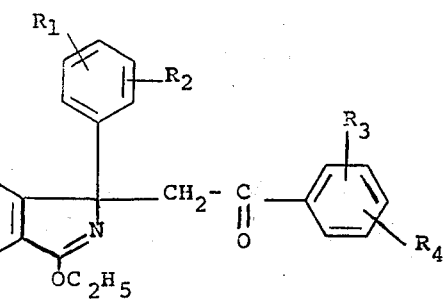

with diborane in an inert solvent to form a racemic mixture of the formula:

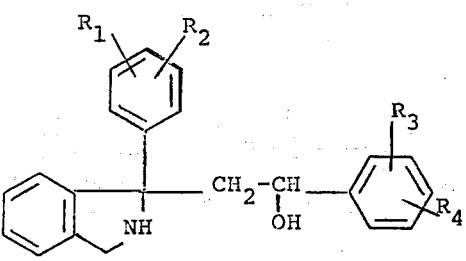

where $R_1$, $R_2$, $R_3$, and $R_4$ are as set out in claim 17, reacting said racemic mixture with D-(+)- pyroglutamic acid, separating the resulting diastereoisomers by crystallization and liberating the enantiomers from the diastereoisomers by treatment with a base.

* * * * *